United States Patent
Krishnegowda et al.

(10) Patent No.: US 11,775,352 B1
(45) Date of Patent: Oct. 3, 2023

(54) AUTOMATED PREDICTION OF COMPUTING RESOURCE PERFORMANCE SCALING USING REINFORCEMENT LEARNING

(71) Applicant: FMR LLC, Boston, MA (US)

(72) Inventors: Nikhil Krishnegowda, Hassan (IN); Saloni Priyani, Chennai (IN); Samir Kakkar, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/994,815

(22) Filed: Nov. 28, 2022

(51) Int. Cl.
*G06F 9/50* (2006.01)

(52) U.S. Cl.
CPC .......... *G06F 9/5077* (2013.01); *G06F 9/5072* (2013.01); *G06F 2209/5019* (2013.01)

(58) Field of Classification Search
CPC ................. G06F 9/5077; G06F 9/5072; G06F 2209/5019
See application file for complete search history.

(56) References Cited

U.S. PATENT DOCUMENTS

| | | | |
|---|---|---|---|
| 2020/0073717 A1* | 3/2020 | Hari | G06Q 30/0201 |
| 2020/0133814 A1* | 4/2020 | Prabath | G06F 16/21 |
| 2020/0404051 A1* | 12/2020 | Guniguntala | H04L 67/10 |

* cited by examiner

*Primary Examiner* — Sisley N Kim
(74) *Attorney, Agent, or Firm* — Cesari & McKenna, LLP

(57) ABSTRACT

Methods and apparatuses are described for automated prediction of computing resource performance scaling using reinforcement learning. A server executes performance tests against a production computing environment comprising a plurality of computing layers to capture performance data for computing resources in the production environment, where the performance tests are configured according to transactions-per-second (TPS) values. The server trains a classification model using the performance data, the trained model configured to predict computing power required by the plurality of computing layers. The server identifies a target TPS value and a target cost tolerance for the production environment and executes the trained classification model using the target TPS value and the target cost tolerance as input to generate a prediction of computing power required by the plurality of computing layers.

20 Claims, 4 Drawing Sheets

| | application | component | load | instance | result |
|---|---|---|---|---|---|
| 0 | APP1 | RDS | 1X | r6g.medium | False |
| 1 | APP1 | RDS | 1X | r6g.large | False |
| 2 | APP1 | RDS | 1X | r6g.xlarge | True |
| 3 | APP1 | RDS | 2X | r6g.xlarge | False |
| 4 | APP1 | RDS | 2X | r6g.4xlarge | True |
| 5 | APP1 | RDS | 3X | r6g.4xlarge | False |
| 6 | APP1 | RDS | 3X | r6g.8xlarge | True |
| 7 | APP1 | RDS | 4X | r6g.8xlarge | True |
| 8 | APP1 | API1 | 1X | t3.nano | False |
| 9 | APP1 | API1 | 1X | t3.micro | False |
| 10 | APP1 | API1 | 1X | t3.small | True |
| 11 | APP1 | API1 | 2X | t3.small | False |
| 12 | APP1 | API1 | 2X | t3.medium | True |
| 13 | APP1 | API1 | 3X | t3.medium | False |
| 14 | APP1 | API1 | 3X | t3.large | True |
| 15 | APP1 | API1 | 4x | t3.large | False |
| 16 | APP1 | API1 | 4x | t3.xlarge | True |

| | daytype | daytime | load |
|---|---|---|---|
| 0 | WEEKDAY | morning | 1X |
| 1 | WEEKDAY | afternoon | 2X |
| 2 | WEEKDAY | evening | 2X |
| 3 | WEEKDAY | night | 1X |
| 4 | WEEKDAY | morning | 1X |
| ... | ... | ... | ... |
| 75 | WEEKDAY | night | 1X |
| 76 | WEEKEND | morning | 1X |
| 77 | WEEKEND | afternoon | 1X |
| 78 | WEEKEND | evening | 1X |
| 79 | WEEKEND | night | 1X |

400

AUTOMATED PREDICTION OF COMPUTING RESOURCE PERFORMANCE SCALING USING REINFORCEMENT LEARNING

TECHNICAL FIELD

This application relates generally to methods and apparatuses, including computer program products, for automated prediction of computing resource performance scaling using reinforcement learning.

BACKGROUND

Cloud computing environments have emerged as an efficient and scalable way to deliver packaged software application code for execution by a large number of end users. A cloud computing environment may comprise several different layers, each corresponding to a particular computing resource or piece of application functionality. These types of cloud-based systems provide fast, horizontal scaling of multiple instances of an application—including the on-the-fly creation of new instances of the application, APIs, and/or backend resources—that can work as a logical unit to ensure availability of the application to end users, especially during periods of increased demand.

Typically, when an organization deploys application resources in a cloud environment, system operators execute performance testing on the application and/or various layers of the environment to understand computing resource limitations and opportunities for scaling in anticipation of demand. For example, testing may involve executing many tests against various configurations of the cloud environment—such as increasing or decreasing resources for virtual machines (e.g., by adjustments to CPU and memory), increasing or decreasing CPU and memory limits of pods or containers, increasing or decreasing CPU of lambda functions, increasing or decreasing concurrency, increasing or decreasing read/write units in a database, etc. and determining whether an optimal configuration has been achieved to support the required load. This is not an efficient way of scaling up an application because it involves manual involvement and guesswork to initialize the testing process. In addition, there is a good probability that most of guesses will be wrong—leading to a significant investment of time to calculate the compute power of application layers in a cloud environment to get the ideal result.

SUMMARY

Therefore, what is needed are methods and systems for automatically predicting computing power configuration of one or more layers of a production computing environment (such as a cloud environment) using a machine learning classification model trained on test execution performance data captured from the environment for a variety of different loads and time periods. Advantageously, the techniques described herein provide for seamless modification of production computing resources (such as instances, CPU, memory, etc.) in real time to proactively mitigate service interruptions due to unanticipated increases in load.

The invention, in one aspect, features a computerized method of automated prediction of computing resource performance scaling using reinforcement learning. A server computing device executes one or more performance tests against a production computing environment comprising a plurality of computing layers to capture performance testing data for one or more computing resources in the production computing environment, where the performance tests are configured according to one or more transactions-per-second (TPS) values. The server computing device trains a machine learning classification model using the performance testing data, the trained classification model configured to predict computing power required by one or more of the plurality of computing layers of the production computing environment. The server computing device identifies a target TPS value and a target cost tolerance for the production computing environment. The server computing device executes the trained classification model using the target TPS value and the target cost tolerance as input to generate a prediction of computing power required by the plurality of computing layers of the production computing environment. The server computing device modifies a configuration of at least one of the computing resources in the production computing environment based upon the generated prediction.

The invention, in another aspect, features a computer system for automated prediction of computing resource performance scaling using reinforcement learning. The system comprises a server computing device having a memory for storing computer-executable instructions and a processor that executes the computer-executable instructions. The server computing device executes one or more performance tests against a production computing environment comprising a plurality of computing layers to capture performance testing data for one or more computing resources in the production computing environment, where the performance tests are configured according to one or more transactions-per-second (TPS) values. The server computing device trains a machine learning classification model using the performance testing data, the trained classification model configured to predict computing power required by one or more of the plurality of computing layers of the production computing environment. The server computing device identifies a target TPS value and a target cost tolerance for the production computing environment. The server computing device executes the trained classification model using the target TPS value and the target cost tolerance as input to generate a prediction of computing power required by the plurality of computing layers of the production computing environment. The server computing device modifies a configuration of at least one of the computing resources in the production computing environment based upon the generated prediction.

Any of the above aspects can include one or more of the following features. In some embodiments, the performance testing data comprises one or more of transaction results or response times associated with one or more transactions executed by the computing resources of the production computing environment. In some embodiments, the one or more computing resources comprise a virtual machine, a database, a pod, a container, or a lambda function. In some embodiments, executing one or more performance tests against the production computing environment further comprises a) modifying a configuration of at least one of the computing resources in the production computing environment based upon the performance testing data, b) re-executing the one or more performance tests against the production computing environment to capture updated performance testing data for one or more of the computing resources, and c) repeating steps a) and b) until an optimal resource cost tolerance is reached for a first one of the one or more TPS values. In some embodiments, the computing device selects a second one of the one or more TPS values and repeating steps a) to c) until an optimal resource cost tolerance is reached for the second TPS value.

In some embodiments, the server computing device collects, from the production computing environment, a production TPS value for each of one or more historical time periods. In some embodiments, the server computing device determines a similarity between a current time and one of the one or more historical time periods. In some embodiments, the server computing device executes the trained classification model using the production TPS value for the similar historical time period as input to generate a current prediction of computing power required by the plurality of computing layers of the production computing environment for the current time. In some embodiments, the server computing device modifies a configuration of at least one of the computing resources in the production computing environment based upon the generated current prediction. In some embodiments, the server computing device re-trains the classification model periodically based upon the collected production TPS values. In some embodiments, modifying a configuration of at least one of the computing resources in the production computing environment based upon the generated prediction comprises one or more of: i) adjusting processing and memory resources of the virtual machine, ii) adjusting processing and memory limits of the pod or the container, iii) adjusting processing resources of the lambda function, or iv) adjusting read/write units in the database.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3 is a diagram of exemplary output generated by performance testing and tracing module after test execution.

FIG. 4 is a diagram of an exemplary production TPS value chart generated by module for different historical time periods.

DETAILED DESCRIPTION

Figure 1:
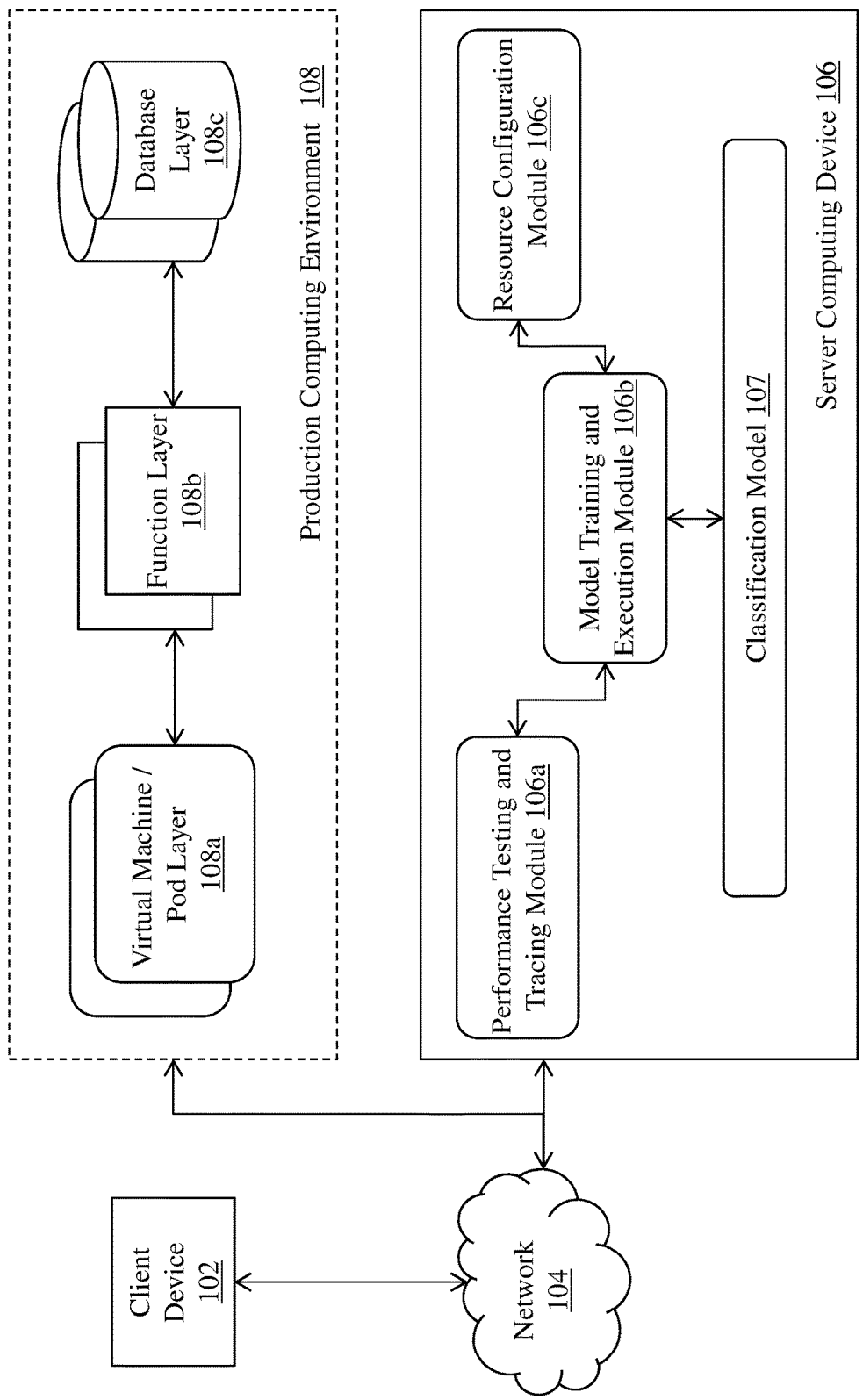
FIG. 1 is a block diagram of a system for automated prediction of computing resource performance scaling using reinforcement learning.

FIG. 1 is a block diagram of a system 100 for automated prediction of computing resource performance scaling using reinforcement learning. System 100 includes client computing device 102, communications network 104, server computing device 106 that includes performance testing and tracing module 106a, model training and execution module 106b, resource configuration module 106c, and classification model 107, and a production computing environment 108 that includes a virtual machine (VM)/pod layer 108a, a function layer 108b, and a database layer 108c.

Client computing device 102 connects to communications network 104 in order to communicate with server computing device 106 and/or production computing environment 108 to provide input and receive output relating to the process for automated prediction of computing resource performance scaling using reinforcement learning as described herein. Client computing device 102 is coupled to a display device (not shown). For example, client computing device 102 can provide a graphical user interface (GUI) via the display device that presents output resulting from the methods and systems described herein. In some embodiments, client computing device 102 is operated by an end user (e.g., a customer using the device 102 to interact with one or more computing resources of production computing environment 108). In these embodiments, the user at client computing device 102 submits requests to production computing environment 108 and receives responses to the requests from production computing environment 108. As can be appreciated, the requests from the end user and responses to the end user can result in the resources 108a, 108b, 108c of production computing environment 108 to execute computing transactions (e.g., function calls, reads, writes, application launches, other processing steps, etc.) that require certain computing power (e.g., processors, memory, virtual machines, instances, network resources, load balancing, etc.) in order to complete. When many end users at different client computing devices interact with the resources 108a, 108b, 108c of production computing environment 108, the environment must be configured to adapt and scale the available computing power and resources in order to meet the demand from the end users.

Exemplary client computing devices 102 include but are not limited to desktop computers, laptop computers, tablets, mobile devices, smartphones, smart watches, Internet-of-Things (IoT) devices, and internet appliances. It should be appreciated that other types of computing devices that are capable of connecting to the components of system 100 can be used without departing from the scope of invention. Although FIG. 1 depicts a single client computing device 102, it should be appreciated that system 100 can include any number of client computing devices.

Communications network 104 enables client computing device 102, server computing device 106, and production computing environment 108 to communicate with each other. Network 104 is typically a wide area network, such as the Internet and/or a cellular network. In some embodiments, network 104 is comprised of several discrete networks and/or sub-networks (e.g., cellular to Internet).

Server computing device 106 is a device including specialized hardware and/or software modules that execute on a processor and interact with memory modules of server computing device 106, to receive data from other components of system 100, transmit data to other components of system 100, and perform functions for automated prediction of computing resource performance scaling using reinforcement learning as described herein. Server computing device 106 includes several computing modules 106a-106c and classification model 107 that execute on one or more processors of server computing device 106. In some embodiments, modules 106a-106c and model 107 are specialized sets of computer software instructions programmed onto one or more dedicated processors in server computing device 106 and can include specifically-designated memory locations and/or registers for executing the specialized computer software instructions.

Although modules 106a-106c and model 107 are shown in FIG. 1 as executing within the same server computing device 106, in some embodiments the functionality of modules 106a-106c and model 107 can be distributed among a plurality of server computing devices. As shown in FIG. 1, server computing device 106 enables modules 106a-106c and model 107 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of modules 106a-106c and model 107 is described in detail below.

Production computing environment 108 comprises one or more specialized computing devices and software modules that provide computing resources arranged in a multi-layered configuration to client computing devices (e.g., device 102). In some embodiments, production computing environment 108 is a cloud-based computing environment that dynamically allocates and scales computing resources in order to meet the demand of client computing devices while also providing cost resource benefits for the organization managing the environment 108 (i.e., only utilizing a minimum level of necessary computing resources for current and/or near-term anticipated demand). Exemplary production computing environments 108 include, but are not limited to, Amazon® AWS™ (aws.amazon.com), Microsoft® Azure™ (azure.microsoft.com), Google® Cloud Platform™ (cloud.google.com), IBM® Cloud™ (www.ibm.com/cloud), DigitalOcean™ (digitalocean.com), and others.

As shown in FIG. 1, production computing environment 108 comprises three resource layers: virtual machine/pod layer 108a, function layer 108b, and database layer 108c. In some embodiments, virtual machine/pod layer 108a comprises a plurality of software application instances (e.g., pods, containers, and/or virtual machines) in isolation from each other, which access a single operating system (OS) kernel. Virtual machine/pod layer 108a can execute each software application instance in a separate OS process, and constrain each instance's access to physical resources (e.g., CPU, memory) of one or more underlying hardware computing devices in environment 108 so that a single instance does not utilize all of the available physical resources. Production computing environment 108 can be configured to scale virtual machine/pod layer 108a horizontally (e.g., create new instances) as needed, based upon the demand received from client devices (e.g., device 102). In some embodiments, virtual machine/pod layer 108a is an Amazon® Elastic Compute Cloud (EC2™) layer. In some embodiments, virtual machine/pod layer 108a utilizes the Kubernetes™ container deployment platform to deploy, manage, and scale the application instances. In these embodiments, server computing device 106 can interface with production computing environment 108 (e.g., via the Kubernetes Pod Autoscaler API functionality, described at kubernetes.io/docs/tasks/run-application/horizontal-pod-autoscale/) in order to provide customized scaling commands. It should be appreciated that other customized or commercially-available instance orchestration platforms (e.g., Apache Mesos™, Boxfuse™) can be used within the scope of invention.

In some embodiments, function layer 108b comprises a plurality of serverless compute services or functions that are capable of executing code, processes, function calls, and/or other computing tasks in order to, e.g., interface with database layer 108c to read/write/update data as part of requests received from virtual machine/pod layer 108a. Exemplary function layers 108b include, but are not limited to, Amazon® AWS Lambda™ (aws.amazon.com/lambda), Microsoft® Azure™ Functions (azure.microsoft.com/en-us/services/functions), and others.

In some embodiments, database layer 108c comprises one or more database instances that are configured to receive, generate, and store specific segments of data in response to one or more requests received from virtual machine/pod layer 108a via function layer 108b. In some embodiments, database instances in database layer 108c can comprise fully managed relational databases (e.g., Microsoft® SQL Server™, Amazon® RDS™), NoSQL databases (e.g., MongoDB™), in-memory databases, and other types of database platforms.

As can be appreciated, the layers 108a, 108b, 108c of production environment 108 communicate with each other in order to receive, process, and respond to requests from client computing device 102. For example, a user at client device 102 may submit a request for application functionality to one or more instances of virtual machine/pod layer 108a. The instance of layer 108a receives the request and executes, e.g., an API call to function layer 108b in order to retrieve data from database layer 108c that is responsive to the user request. One or more functions in function layer 108b receive the API call and related parameters from layer 108a, and submit a data request (e.g., read, write, update, etc.) to one or more instances in database layer 108c. Database instance(s) return a response to the data request to function layer 108b, which in turn provides the responsive data to the instance in virtual machine/pod layer 108a. Each transaction in this exemplary process requires a certain amount of computing power to be utilized by hardware device(s) in production computing environment 108 in order to complete, and each transaction takes a certain amount of time to accomplish. In addition, the overall transaction (i.e., from receipt of user request at virtual machine/pod layer 108a at time T1 to transmission of response to user request back to client device 102 at time T2) can be measured according to a response time (i.e., T2-T1). Furthermore, production computing environment 108 can be evaluated based upon a number of transactions processed during a certain amount of time—one metric that can be used is transactions-per-second (TPS). The TPS value for environment 108 is useful in determining and predicting an amount of computing power/resources required to handle transactions according to a specified TPS value, as will be described in detail herein. Also, it should be understood that the TPS value for production environment 108 can fluctuate based upon certain time-related parameters, such as day of the week, time of day, holidays, other events, etc. For example, production environment 108 may be subject to different loads or levels of transactions-per-second during specific times of day (e.g., working hours vs. non-working hours) and/or days of week (e.g., Mon.-Fri. vs. weekend). As a result, production computing environment 108 has to adjust the available computing power and resources in order to satisfy the TPS value for a given time period.

Figure 2:
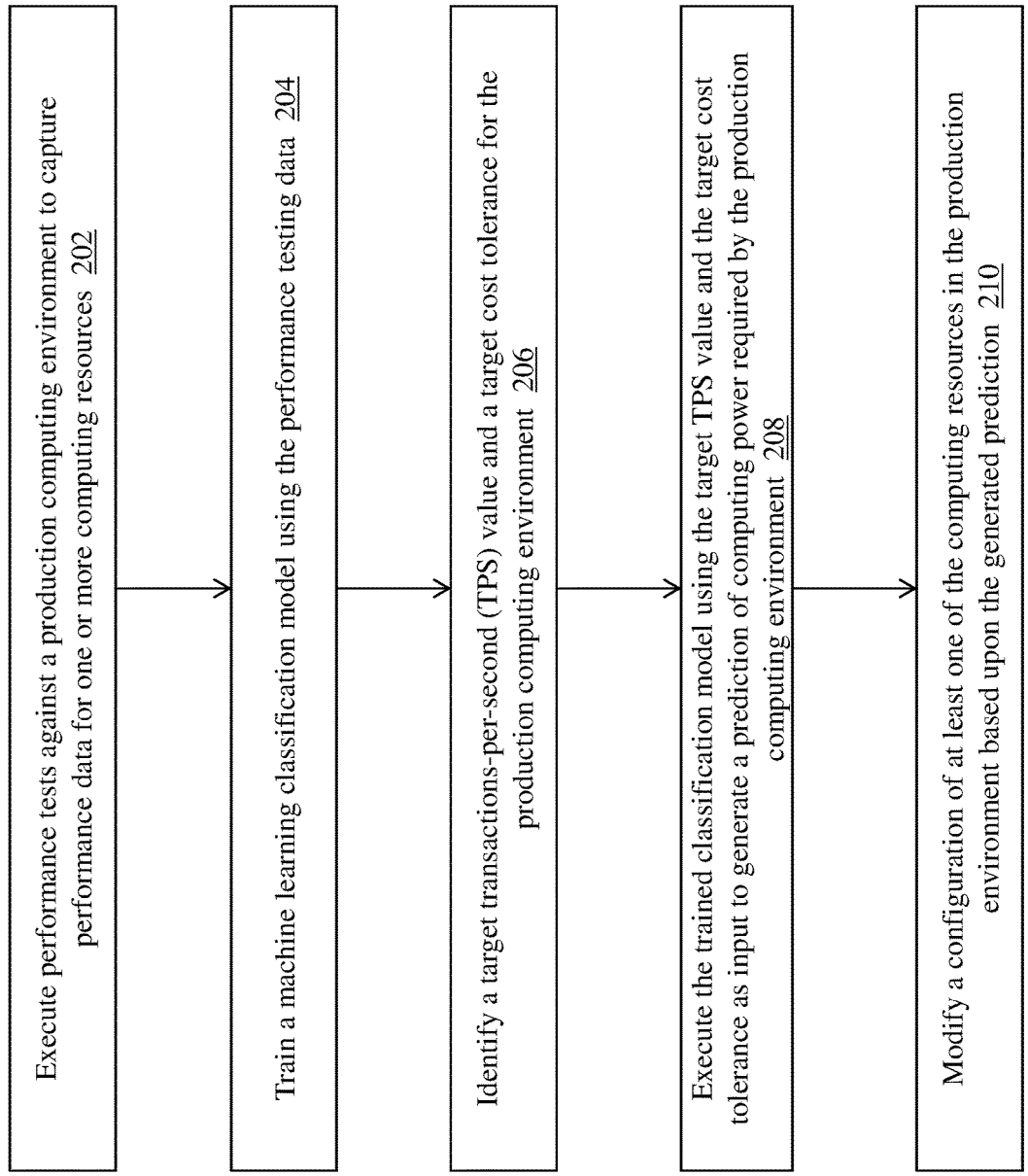
FIG. 2 is a flow diagram of a computerized method of automated prediction of computing resource performance scaling using reinforcement learning.

FIG. 2 is a flow diagram of a computerized method 200 of automated prediction of computing resource performance scaling using reinforcement learning, using system 100 of FIG. 1. Performance testing and tracing module 106a executes (step 202) one or more performance tests against production computing environment 108 to capture performance data for one or more computing resources (i.e., virtual machines or pods or containers in VM/pod layer 108a; lambda functions in function layer 108b, and databases in database layer 108c). In some embodiments, module 106a initiates a plurality of transactions for processing by production computing environment 108, where the transactions are the same or similar to those that would be initiated by end users via client computing device(s) 102. For example, the one or more performance tests may comprise one or more programmatic scripts that, when executed by module 106a, generate and submit transactions to environment 108. During execution of the performance tests, module 106a is configured to trace execution of the transactions throughout the layers 108a, 108b, 108c of environment 108—in one embodiment, module 106a deploys a tracing tool to each layer of environment which captures relevant performance information (e.g., response time(s), results, errors) of the transactions and of related computing resources (e.g., processor/memory usage, application instance count, concurrency, scaling, etc.). Module 106a captures the performance data from the tracing deployment and stores the performance data for training of model 107.

As can be appreciated, the test execution phase can occur continuously over a period of time, with periodic adjustments made to the transaction generation in order to learn an optimal configuration of the computing resources in production computing environment 108 under different TPS conditions. As an example, a first series of performance tests may be configured to generate and submit transactions to achieve a defined TPS value (e.g., 1×TPS) against production computing environment 108 such that module 106a captures the above-referenced performance data and correlates the data with the defined TPS value. Then, one or more configuration attributes of the layers 108a, 108b, and/or 108c of environment 108 are modified such as increase in tiers, horizontal scaling, concurrency, read/write units, memory allocation, processor availability, etc. Module 106a can re-execute the performance tests against the modified production environment 108 using the same defined TPS value (1×TPS) and re-capture new performance data. Module 106a can repeat the above steps of executing tests, capturing performance data, adjusting configuration attributes, and re-executing performance tests until module 106a has determined that the presently-tested configuration of computing resources in production computing environment 108 has reached an optimal state. In one example, module 106a can determine that an optimal configuration state has been reached when small changes in configuration of computing resources occur between test execution runs with little or no change in the performance results.

In some embodiments, module 106a also considers a cost tolerance when determining whether a particular resource configuration in production environment 108 is an optimal configuration. As can be understood, the cost for typical cloud computing environments depends upon, e.g., the amount of resources used, the length of time such resources are used, etc. An organization may wish to balance availability of application resources with budgetary concerns. Therefore, module 106a can be configured to classify particular resource configurations as non-optimal (even where the performance characteristics of the configuration(s) are the best) if a calculated cost value associated with implementation of the configuration exceeds the defined cost tolerance.

After the optimal configuration state is determined for a first TPS value, performance testing and tracing module 106a can select a different TPS value (e.g., 2×) and repeat the test execution, data capture, and configuration modification process described in the previous paragraph with the new TPS value until module 106a has determined that an optimal resource configurations state is reached for the new TPS value. As can be appreciated, module 106a can repeat this process any number of different times with different TPS values in order to capture performance data and configuration attributes for a range of different TPS values. FIG. 3 is a diagram of exemplary output 300 generated by performance testing and tracing module 106a after test execution. As shown in FIG. 3, components (RDS, API1) of a particular application (APP1) are tested under differing load (TPS) conditions (1×, 2×, 3×, 4×) and differing instance sizes (e.g., for an Amazon® EC2™ deployment, sizes can be r6g.medium, r6g.large, r6g.xlarge, r6g.4xlarge, r6g.8xlarge, t3.nano, t3.micro, t3.small, t3.medium, t3.large, t3.xlarge). The result column indicates whether the specific application/component works for the corresponding load and instance configuration.

Once generated, the dataset depicted in FIG. 3 is used to train classification model 107. This dataset is referred to as a reinforcement learning dataset, which relates to finding an ideal combination of compute power of all layers in the application to get the best response time for the requests. This process undergoes multiple iterations, e.g., where the compute power of different layers is changed (i.e. increased or decreased) until an ideal combination is determined.

In addition, a second dataset is used in conjunction with the dataset of FIG. 3 to train classification model 107. In some embodiments, performance testing and tracing module 106a is configured to periodically collect, from production computing environment, a production TPS value for each of one or more historical time periods. Module 106a can monitor the performance and load of environment 108 during a period of time and collect specific TPS values for the time period at any number of different granularities. For example, module 106a can collect production TPS value data four times a day (morning, afternoon, evening, night) or more frequently (e.g., every hour). In addition, module 106a can collect production TPS values for different days of the week and/or differentiate days of the week by, e.g., weekday and weekend. FIG. 4 is a diagram of an exemplary production TPS value dataset 400 generated by module 106a for different historical time periods. As shown in FIG. 4, dataset 400 comprises a record for each time period containing e.g., daytype (WEEKDAY, WEEKEND), daytime (morning, afternoon, evening, night), and load/TPS (1×, 2×, . . . ).

Using the production TPS values and the performance output data from the test execution, model training and execution module 106b trains (step 204) classification model 107 to generate a prediction of computing power (i.e., particular configuration(s)) of CPU and/or memory) required by one or more of the plurality of computing layers 108a, 108b, 108c of the production computing environment 108 for a given application/component and TPS value(s), and in some embodiments, for a given time period. In some embodiments, module 106b converts the performance output data (and, where applicable, the historical TPS value data) from text strings into numbers to make training of classification model 107 easier. In some embodiments, module 106b splits the performance output data into two datasets: a training dataset and a validation dataset. For example, module 106b can use approximately 80% of the performance output data as training data and approximately 20% of the performance output data as validation data. As can be appreciated, once classification model 107 is trained, model 107 can predict a TPS value for an input application/component in production computing environment 108 at a defined time period. An exemplary implementation of model training and execution module 106b can utilize the Python programming language and related libraries (e.g., sklearn, seaborn, matplotlib, numpy and pandas to train classification model 107.

Turning back to FIG. 2, the trained classification model can now be used to automatically predict computing power required for applications/components in production computing environment 108 for a future time period, and to automatically modify a configuration of computing resources 108a, 108b, 108c in environment 108 based upon the prediction. Model training and execution module 106b identifies (step 206) a target TPS value and a target cost tolerance for production computing environment 108. In some embodiments, a developer or system administrator can provide the target TPS value and target cost tolerance as input to module 106b. In other embodiments, module 106b can automatically identify the target TPS value and/or target cost tolerance based upon predefined information stored in module 106b—e.g., a data structure can be configured for module 106b to automatically determine a target TPS value and/or target cost tolerance based upon system conditions without necessitating user input. For example, module 106b can implement a scheduler that checks a current date/time (or upcoming date/time) of production computing environment 108 and provides the date/time value as input to model 107 for prediction of a TPS value that is likely to be imposed on environment 108 during the date/time. As can be appreciated, model 107 determines a historical time period that is similar in one or more aspects to the input date/time and provides the TPS value captured in production environment 108 during that historical time period. In another example, module 106b can retrieve a cost tolerance value (that may also be correlated to date/time) for configuration of production environment 108. Module 106b can use the target TPS value and target cost tolerance value (or in some embodiments, only the target TPS value or target cost tolerance value) as input for execution of model 107.

Model training and execution module 106b executes (step 208) trained classification model 107 using the target TPS value and/or the target cost tolerance as input to generate a prediction of computing power required by production computing environment 108. In some embodiments, based upon the target TPS value and/or target cost tolerance, model 107 returns a particular resource configuration for environment 108 that is predicted to support one or more applications/components under the target TPS value and also satisfies the target cost tolerance. In one example, model 107 returns an instance type needed to support a particular layer 108a, 108b, 108c of environment 108 for the input load conditions.

Resource configuration module 106c receives the prediction output from classification model 107 and modifies (step 210) a configuration of at least one of computing resources 108a, 108b, 108c in production environment 108 based upon the generated prediction. In some embodiments, module 106c issues an API call to production computing environment 108 that instructs environment to adjust one or more aspects or characteristics of the layer(s) 108a, 108b, 108c of environment based upon the predicted configuration. For example, if model 107 returns an instance type of t3.small as output, module 106c connects to environment 108 and scales one or more computing resources up or down in order to match the instance type. Module 106c can provide instructions to production computing environment 108 to, e.g., adjust processing and memory resources of one or more virtual machine(s) in layer 108a, adjust processing and memory limits of one or more pod(s) or container(s) in layer 108a, adjust processing resources of one or more lambda function(s) in layer 108b, and/or adjust read/write units in one or more database(s) in layer 108c.

The methods and systems described herein advantageously provide for an automated and seamless approach to resource scaling in production computing environments, such as cloud-based frameworks. Instead of being reliant on manual intervention in response to unexpected load events, system 100 is capable of automatically predicting load values for specific time periods and proactively adjusting the computing resources 108a, 108b, 108c allocated to production computing environment 108 so as to optimize application availability and cost tolerances for the enterprise. As can be appreciated, system 100 leverages reinforcement learning concepts to continually re-train classification model 107 based upon monitoring of environment load so that the predictions provided by model 107 are improved and allow for automatic adjustment based upon changes to traffic patterns in the future.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of automated prediction of computing resource performance scaling using reinforcement learning, the method comprising:

executing, by a server computing device, a plurality of series of performance tests against a production computing environment comprising a plurality of computing layers to capture performance testing data for one or more computing resources in the production computing environment, wherein each series of performance tests is configured according to a different transactions-per-second (TPS) value and wherein execution of each of the series of performance tests comprises:

a) generating and submitting transactions to the production computing environment to achieve a defined TPS value, b) capturing the performance testing data during execution of the series of performance tests via a tracing tool deployed in each computing layer of the production computing environment, c) modifying one or more configuration attributes of one or more of the computing layers, the configuration attributes comprising a number of tiers, horizontal scaling, concurrency, read/write unites, memory allocation, and processor availability; and d) repeating steps a) to c) until an optimal resource cost tolerance is reached for the defined TPS value;

training, by the server computing device, a machine learning classification model using the performance testing data, the trained classification model configured to predict computing power required by one or more of the plurality of computing layers of the production computing environment;

identifying, by the server computing device, a target TPS value and a target cost tolerance for the production computing environment;

executing, by the server computing device, the trained classification model using the target TPS value and the target cost tolerance as input to generate a prediction of computing power required by the plurality of computing layers of the production computing environment, the prediction of computing power comprising a configuration of processing units and memory resources that corresponds to an instance type; and modifying, by the server computing device, a configuration of at least one of the computing resources in the production computing environment based upon the generated prediction.

2. The method of claim 1, wherein the performance testing data comprises one or more of transaction results or response times associated with one or more transactions executed by the computing resources of the production computing environment.

3. The method of claim 2, wherein the one or more computing resources comprise a virtual machine, a database, a pod, a container, or a lambda function.

4. The method of claim 3, wherein modifying a configuration of at least one of the computing resources in the production computing environment based upon the generated prediction comprises one or more of:
 i) adjusting processing and memory resources of the virtual machine according to the configuration of processing units and memory resources identified in the generated prediction,
 ii) adjusting processing and memory limits of the pod or the container according to the configuration of processing units and memory resources identified in the generated prediction,
 iii) adjusting processing resources of the lambda function according to the configuration of processing units identified in the generated prediction, or
 iv) adjusting read/write units in the database according to the configuration of processing units and memory resources identified in the generated prediction.

5. The method of claim 1, further comprising collecting, by the server computing device from the production computing environment, a production TPS value for each of one or more historical time periods.

6. The method of claim 5, further comprising determining, by the server computing device, a similarity between a current time and one of the one or more historical time periods.

7. The method of claim 6, further comprising executing, by the server computing device, the trained classification model using the production TPS value for the similar historical time period as input to generate a current prediction of computing power required by the plurality of computing layers of the production computing environment for the current time.

8. The method of claim 7, further comprising modifying, by the server computing device, a configuration of at least one of the computing resources in the production computing environment based upon the generated current prediction.

9. The method of claim 8, further comprising re-training, by the server computing device, the classification model periodically based upon the collected production TPS values.

10. The method of claim 1, wherein the server computing device issues an application programming interface (API) call to the production computing environment that instructs the production computing environment to scale one or more of the computing resources up or down to match the instance type predicted by the trained classification model.

11. A computer system for automated prediction of computing resource performance scaling using reinforcement learning, the system comprising a server computing device with a memory for storing computer-executable instructions and a processor that executes the computer-executable instructions to:
 execute a plurality of series of performance tests against a production computing environment comprising a plurality of computing layers to capture performance testing data for one or more computing resources in the production computing environment, wherein each series of performance tests is configured according to a different transactions-per-second (TPS) value and wherein execution of each of the series of performance tests comprises:
  a) generating and submitting transactions to the production computing environment to achieve a defined TPS value,
  b) capturing the performance testing data during execution of the series of performance tests via a tracing tool deployed in each computing layer of the production computing environment,
  c) modifying one or more configuration attributes of one or more of the computing layers, the configuration attributes comprising a number of tiers, horizontal scaling, concurrency, read/write unites, memory allocation, and processor availability; and
  d) repeating steps a) to c) until an optimal resource cost tolerance is reached for the defined TPS value;
 train a machine learning classification model using the performance testing data, the trained classification model configured to predict computing power required by one or more of the plurality of computing layers of the production computing environment;
 identify a target TPS value and a target cost tolerance for the production computing environment;
 execute the trained classification model using the target TPS value and the target cost tolerance as input to generate a prediction of computing power required by the plurality of computing layers of the production computing environment, the prediction of computing power comprising a configuration of processing units and memory resources that corresponds to an instance type; and
 modify a configuration of at least one of the computing resources in the production computing environment based upon the generated prediction.

12. The system of claim 11, wherein the performance testing data comprises one or more of transaction results or response times associated with one or more transactions executed by the computing resources of the production computing environment.

13. The system of claim 12, wherein the one or more computing resources comprise a virtual machine, a database, a pod, a container, or a lambda function.

14. The system of claim 13, wherein modifying the configuration of at least one of the computing resources in the production computing environment based upon the generated prediction comprises one or more of:
 i) adjusting processing and memory resources of the virtual machine according to the configuration of processing units and memory resources identified in the generated prediction, ii) adjusting processing and memory limits of the pod or the container according to the configuration of processing units and memory resources identified in the generated prediction, iii) adjusting processing resources of the lambda function according to the configuration of processing units identified in the generated prediction, or iv) adjusting read/write units in the database according to the configuration of processing units and memory resources identified in the generated prediction.

15. The system of claim 11, wherein the server computing device collects, from the production computing environment, a production TPS value for each of one or more historical time periods.

16. The system of claim 15, wherein the server computing device determines a similarity between a current time and one of the one or more historical time periods.

17. The system of claim 16, wherein the server computing device executes the trained classification model using the production TPS value for the similar historical time period as input to generate a current prediction of computing power required by the plurality of computing layers of the production computing environment for the current time.

18. The system of claim 17, wherein the server computing device modifies a configuration of at least one of the computing resources in the production computing environment based upon the generated current prediction.

19. The system of claim 18, wherein the server computing device re-trains the classification model periodically based upon the collected production TPS values.

20. The system of claim 11, wherein the server computing device issues an application programming interface (API) call to the production computing environment that instructs the production computing environment to scale one or more of the computing resources up or down to match the instance type predicted by the trained classification model.

* * * * *